United States Patent [19]

Saxon

[11] 4,013,844
[45] Mar. 22, 1977

[54] LINE CIRCUIT FOR A UNIVERSAL KEY/INTERNAL TELEPHONE SYSTEM

[75] Inventor: Bruce Ronald Saxon, Harrisburg, Pa.

[73] Assignee: International Telephone and Telegraph Corporation, Nutley, N.J.

[22] Filed: Feb. 6, 1976

[21] Appl. No.: 655,805

[52] U.S. Cl. .................................................. 179/99
[51] Int. Cl.² .......................................... H04M 1/72
[58] Field of Search .................. 179/99, 1 H, 18 BF

[56] References Cited

UNITED STATES PATENTS 3,865,995   2/1975   Kerman et al. ....................... 179/99
3,872,261   3/1975   Shinoi et al. ......................... 179/99

Primary Examiner—Kathleen H. Claffy
Assistant Examiner—Randall P. Myers
Attorney, Agent, or Firm—John T. O'Halloran; Alfred C. Hill

[57] ABSTRACT

A double coil relay has one coil coupled between the ring conductor and ground and the other coil coupled between the tip conductor and a negative direct current voltage. The tip and ring conductors are coupled to telephone subsets external to the line circuit. The double coil relay lights subset busy lamps external of the line circuit when a subset is off-hook. A branched telephone circuit is also provided for voice signals in a normal conversation mode with another telephone subset external of the line circuit coupled to another line circuit identical to the present line circuit and a selecting paging mode. A second single coil relay is coupled to the double coil relay to provide the normal conversation mode and to select the paging mode with the single coil relay disabling the conversation mode when the paging mode is selected. The two relays are operated by power supply voltages and polarities present in a conventional key telephone system service unit external of the line circuit.

7 Claims, 1 Drawing Figure

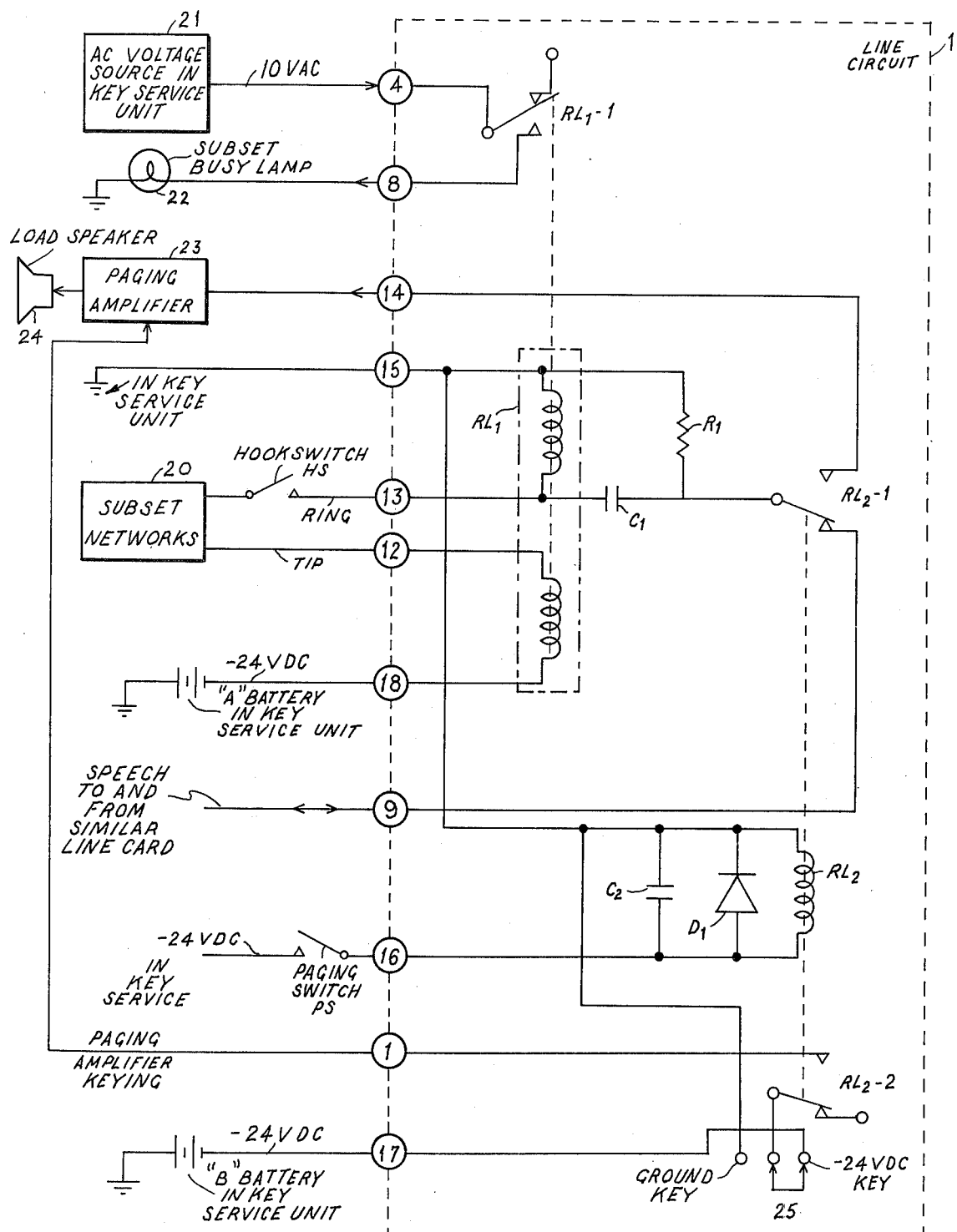

LINE CIRCUIT FOR A UNIVERSAL KEY/INTERNAL TELEPHONE SYSTEM

BACKGROUND OF THE INVENTION

This invention relates to a universal key/internal telephone system and more particularly to a line circuit for such a system.

Prior art line circuits are employed where a balanced internal line is required in an internal telephone system. These prior art line circuits employ circuitry that provides DC (direct current) operating current to tip and ring circuits of conventional telephone type subsets. In addition, to DC operating current, these same line circuits provide balanced retard coils for the development of voiced signals over the tip and ring conductor pair. The subsets attached to these line circuits are usually equipped with momentary contact buttons which provide a circuit closure. This circuit closure can be used to activate components in the line circuit that provides the ability to operate an external audio power amplifier for the purposes of paging over a loud speaker system.

The disadvantages of the prior art line circuits is the lack of convenient application to new or existing key telephone systems. The prior art line circuits employ circuit configurations that have power supply polarity and control requirements alien to those found in the conventional key service units (KSU) of a key telephone system. In addition, the physical configuration requires separate housing and wiring facilities. Thus, internal line or lines added to a key telephone system must be housed in their own chassis mounted outside the KSU.

SUMMARY OF THE INVENTION

An object of the present invention is to provide a line circuit that eliminates the aforementioned disadvantages of the prior art line circuits.

Another object of the present invention is to provide a balanced internal line circuit which operates from the power supply voltage and polarity found in a conventional KSU.

A feature of the present invention is the provision of a line circuit for a universal key/internal telephone system comprising: first means coupled to a tip and a ring conductor of a telephone subset external of the line circuit to light a subset busy lamp external of the line circuit when the subset is "off-hook" and to provide a balanced telephone circuit for voice signals in a normal conversation mode with another telephone subset external of the line circuit coupled to a line circuit identical to the present line circuit and in a paging mode when the paging mode is selected; and second means coupled to the ring conductor to select the paging mode, the second means disabling the conversation mode when the paging mode is selected; the first and second means being coupled to power supply voltages having polarities present in a conventional key telephone system service unit external of the line circuit.

BRIEF DESCRIPTION OF THE DRAWING

The above-mentioned and other features and objects of this invention and the manner of obtaining them will become more apparent by reference to the following description taken in conjunction with the drawing, the single FIGURE of which is a schematic diagram partially in block form of a line circuit in accordance with the principles of the present invention.

DESCRIPTION OF THE PREFERRED EMBODIMENTS

According to the FIGURE, line circuit 1 is contained on a plug-in printed circuit card that will fit in one of the CO/PBX (central office/private branch exchange) card receptacles provided in a conventional KSU. The power supply and ground busses common to all CO/PBX card receptacles are used to feed operational voltages to the internal telephone system line circuit. The existing KSU cabling running from each CO/PBX receptacle to individual contacts on the main telephone frame is used to provide connection of the internal telephone system line functions to the internal system subsets. Thus, tip, ring, busy lamp, and paging (key) functions can be connected to the internal system subsets without modification to the KSU, or interference with the CO/PBX card functions.

A balanced telephone circuit is provided in line circuit 1 by the dual coil relay $RL_1$. The tip and ring conductor connections from subset network 20 are coupled to relay $RL_1$ via the printed circuit (PC) board terminals 12 and 13, respectively. Common ground in the key service unit is coupled to line circuit 1 via PC board terminal 15, while filtered −24 volt DC (KSU "A" battery) for operation of the balanced phone circuit, is supplied via PC board terminal 18. When relay $RL_1$ is activated by placing subset network 20 across the tip and ring terminals 12 and 13 via placing hook switch HS in a closed position, contact set $RL_1$-1 completes the path from the AC voltage source 21 in the KSU to the subset busy lamp 22 via PC board terminals 4 and 8.

Paging is accomplished by coupling −24 volt DC via cable resistance and paging switch PS in a closed position to PC board terminal 16. This completes a path from ground to −24 volt DC through the coil of relay $RL_2$. Diode $D_1$ suppresses inductive voltages generated by relay $RL_2$ when its current path is interrupted at the end of a page. Capacitor C2 provides a time delay in the keying circuit. Relay contact set $RL_2$-2 provides either −24 volt DC or ground at PC board terminal 1 for the purpose of keying a paging amplifier 23 which is an audio power amplifier for driving loud speaker 24. The choice of −24 volt DC or ground is made via the jumper 25. The source of the −24 volt DC key is from the KSU B battery via PC board terminal 17.

During conversation or paging, voice signals are developed across both coils of relay $RL_1$. These signals are coupled from the upper coil via capacitor $C_1$ to resistor $R_1$ and the armature of relay contact set $RL_2$-1. When activated during a page, relay contact set $RL_2$-1 connects the voice signals via its normally open contact to the input of amplifier 23 via PC board terminal 14. When quiescent, the normally closed contact of relay contact set $RL_2$-1 connects voice signals to the PC board terminal 9. If two line circuits have their PC board terminal 9's connected together, then phone conversation between these line circuits is possible. The conversation path is broken when either line circuit pages. Thus, standard internal telephone system and private page operation is possible between two designated line circuits.

As can be seen, line circuit 1 enables the addition of internal connections with paging capabilities to a conventional key telephone system service unit without modifications to this unit.

While I have described above the principles of my invention in connection with specific apparatus it is to be clearly understood that this description is made only by way of example and not as a limitation to the scope of my invention as set forth in the objects thereof and in the accompanying claims.

I claim:

1. A line circuit for a universal key/internal telephone system comprising:
   first means coupled to a tip and a ring conductor of a telephone subset external of said line circuit to light a subset busy lamp external of said line circuit when said subset is "off-hook" and to provide a balanced telephone circuit for voice signals in a normal conversation mode with another telephone subset external of said line circuit coupled to a line circuit identical to said line circuit and in a paging mode when said paging mode is selected; and
   second means coupled to said ring conductor to select said paging mode, said second means disabling said conversation mode when said paging mode is selected;
   said first and second means being coupled to power supply voltages having polarities present in a conventional key telephone system service unit external of said line circuit.

2. A line circuit according to claim 1, wherein said first means includes
   a first relay having a first coil with one terminal coupled to ground potential present in said service unit and the other terminal coupled to said ring conductor and a second coil with one terminal coupled to a first negative direct current voltage present in said service unit and the other terminal coupled to said tip conductor, said first and second coils providing said balanced telephone circuit,
   an alternating current voltage source present in said service unit, and
   a first contact set controlled by said first and second coils to connect said alternating current voltage source to said busy lamp when said subset is "off-hook" for lighting said busy lamp.

3. A line circuit according to claim 2, wherein said first means further includes
   a resistor having one terminal coupled to said one terminal of said first coil, and
   a first capacitor having one terminal coupled to said other terminal of said first coil and the other terminal coupled to the other terminal of said resistor.

4. A line circuit according to claim 3, wherein said second means includes
   a second relay having one terminal coupled to said ground potential and the other terminal coupled to a normally open paging switch external of said line circuit, said second relay being activated when said paging switch is closed to couple a second negative direct current voltage present in said service unit to said other terminal of said second relay,
   a second contact set controlled by said second relay to provide a selected one of said ground potential and a third direct current voltage present in said service unit to activate a paging amplifier external of said line circuit when said second relay is activated, and
   a third contact set controlled by said second relay having an armature coupled to said other terminal of both said resistor and said first capacitor, a normally closed contact to provide said conversation mode and a normally open contact coupled to the input of said paging amplifier to provide said paging mode when said second relay is activated.

5. A line circuit according to claim 4, wherein said second means further includes
   a diode coupled in shunt relation with respect to said second relay to suppress inductive voltages generated by said second relay when its current path is interrupted at the end of a page, and
   a second capacitor coupled in shunt relation with respect to said second relay and said diode to provide a time delay in said second means.

6. A line circuit according to claim 1, wherein said second means includes
   a relay having one terminal coupled to ground potential present in said service unit and the other terminal coupled to a normally open paging switch external of said line circuit, said relay being activated when said paging switch is closed to couple a first negative direct current voltage present in said service unit to said other terminal of said relay,
   a first contact set controlled by said relay to provide a selected one of said ground potential and second direct current voltage present in said service unit to activate a paging amplifier external of said line circuit when said relay is activated, and
   a second contact set controlled by said relay having an armature coupled to said first means, a normally closed contact to provide said conversation mode and a normally open contact coupled to the input of said paging amplifier to provide said paging mode when said relay is activated.

7. A line circuit according to claim 6, wherein said second means further includes
   a diode coupled in shunt relation with respect to said relay to suppress inductive voltages generated by said relay when its current path is interrupted at the end of a page, and
   a capacitor coupled in shunt relation with respect to said relay and said diode to provide a time delay in said second means.

* * * * *